(12) United States Patent
Tiku et al.

(10) Patent No.: US 11,556,790 B2
(45) Date of Patent: Jan. 17, 2023

(54) ARTIFICIAL NEURAL NETWORK TRAINING IN MEMORY

(71) Applicant: Micron Technology, Inc., Boise, ID (US)

(72) Inventors: Saideep Tiku, Fort Collins, CO (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 294 days.

(21) Appl. No.: 17/039,243

(22) Filed: Sep. 30, 2020

(65) Prior Publication Data

US 2022/0101119 A1 Mar. 31, 2022

(51) Int. Cl.
*G06N 3/08* (2006.01)
*G06F 11/10* (2006.01)

(52) U.S. Cl.
CPC ............ *G06N 3/08* (2013.01); *G06F 11/1076* (2013.01)

(58) Field of Classification Search
CPC .............................. G06N 3/08; G06F 11/1076
See application file for complete search history.

(56) References Cited

U.S. PATENT DOCUMENTS

| | | | |
|---|---|---|---|
| 9,111,222 B2 | 8/2015 | Aparin | |
| 9,715,655 B2 | 7/2017 | Wu et al. | |
| 2015/0178620 A1 | 6/2015 | Ascari et al. | |
| 2019/0265701 A1* | 8/2019 | Troia | G06F 21/00 |
| 2019/0341091 A1 | 11/2019 | Sity et al. | |
| 2020/0117539 A1 | 4/2020 | Sun et al. | |
| 2020/0171671 A1* | 6/2020 | Huang | B25J 9/161 |
| 2020/0210816 A1 | 7/2020 | Luo et al. | |

OTHER PUBLICATIONS

Toshiki Nakamura et al., 'Adaptive Artificial Neural Network-Coupled LDPC ECC as Universal Solution for 3-D and 2-D, Charge-Trap and Floating-Gate NAND Flash Memories', IEEE Journal of Solid-State Circuits, vol. 54, No. 3, Mar. 2019, pp. 1-10.
International Search Report and Written Opinion from related PCT Application No. PCT/US2021/051169, dated Dec. 27, 2021, 10 pages.

* cited by examiner

*Primary Examiner* — Kyle Vallecillo
(74) *Attorney, Agent, or Firm* — Brooks, Cameron & Huebsch, PLLC

(57) ABSTRACT

Apparatuses and methods can be related to implementing age-based network training. An artificial neural network (ANN) can be trained by introducing errors into the ANN. The errors and the quantity of errors introduced into the ANN can be based on age-based characteristics of the memory device.

20 Claims, 4 Drawing Sheets

ACCESSING, FROM A MEMORY ARRAY OF A MEMORY DEVICE, DATA REPRESENTING ELEMENTS OF AN ARTIFICIAL NEURAL NETWORK MODEL, THE ELEMENTS COMPRISING A PLURALITY OF WEIGHTS AND A PLURALITY OF BIASES —381

INTRODUCING LOGICAL VALUES AT ONE OR MORE LOCATIONS OF A BIT STRING, THE LOGICAL VALUES REPRESENTATIVE OF A NUMBER OF ERRORS THAT CORRESPOND TO AN EXPECTED BIT-ERROR RATE OF THE MEMORY DEVICE, DURING TRAINING OF THE ARTIFICIAL NEURAL NETWORK MODEL —382

IMPLEMENTING THE ARTIFICIAL NEURAL NETWORK MODEL IN THE MEMORY DEVICE BASED AT LEAST IN PART ON WRITING THE INTRODUCED LOGIC VALUES OF THE BIT STRING TO THE MEMORY ARRAY —383

ARTIFICIAL NEURAL NETWORK TRAINING IN MEMORY

TECHNICAL FIELD

The present disclosure relates generally to memory, and more particularly to apparatuses and methods associated with age-based network training.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1:
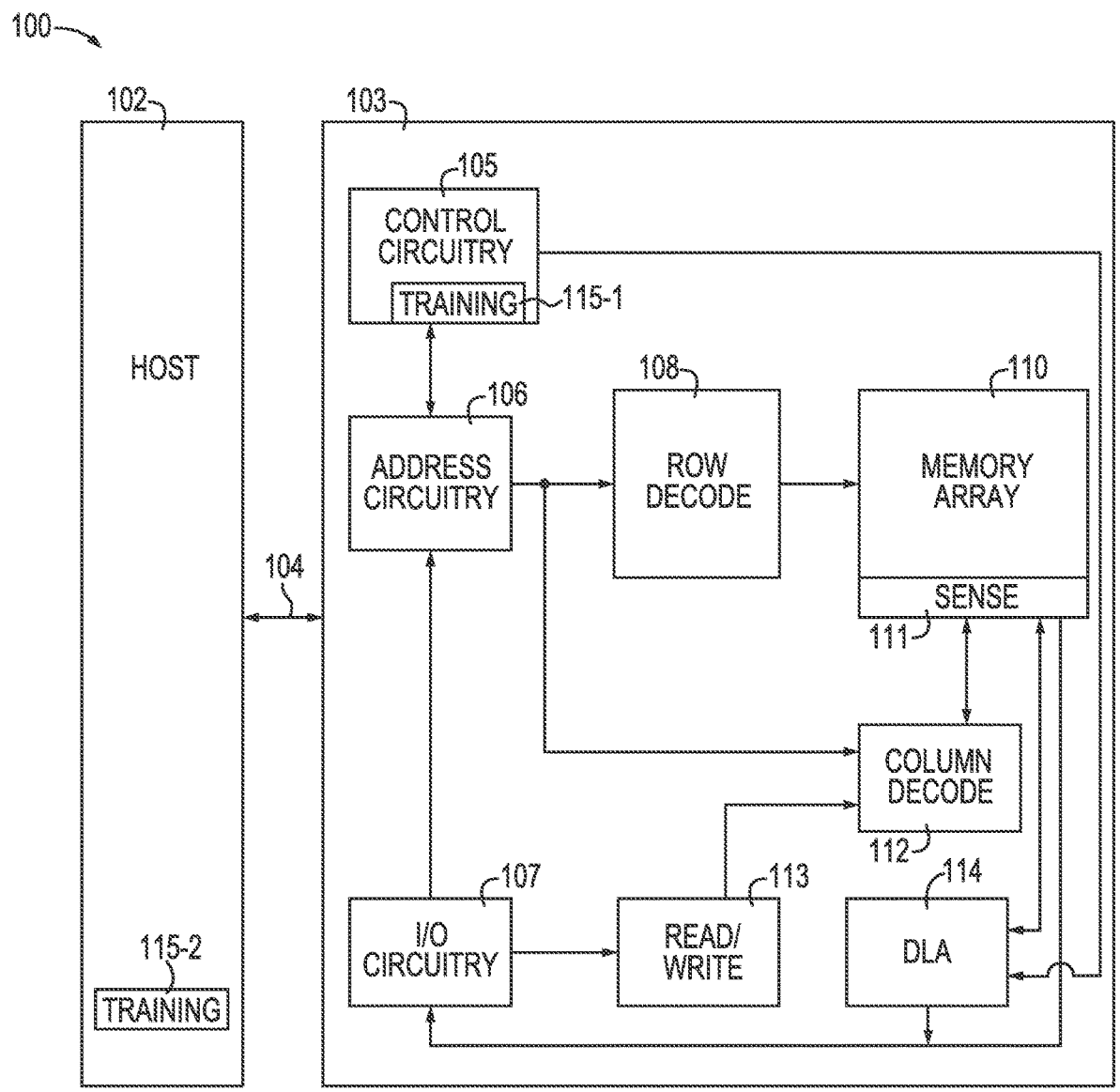
FIG. 1 is a block diagram of an apparatus in the form of a computing system including a memory device in accordance with a number of embodiments of the present disclosure.

The present disclosure includes apparatuses and methods related to age-based network training. The training of a network can be customized to the age of a memory device. The network can be any of a number of different types of deep learning networks such as artificial neural network (ANN). Although the examples described herein are provided in terms of the ANN, the examples described herein can also be applied to different types of networks.

As used herein, the ANN can provide learning by forming probability weight associations between an input and an output. The probability weight associations can be provided by a plurality of nodes that comprise the ANN. The nodes together with weights, biases, and activation functions can be used to generate an output of the ANN based on the input to the ANN.

Inexpensive and energy-efficient artificial intelligence (AI) accelerators such as deep learning accelerators (DLAs) can be implemented on a same die, substrate, or interposed as a memory array of a memory device. This location of the DLA in proximity to the memory array may be referred to as an edge of a memory device. The edge of the memory device can also refer to an area of the memory device other than an area of the memory device occupied by the memory array and/or the sensing circuitry. For example, an edge of the memory device can refer to an output and/or input path of a memory device, where the output path and/or the input path is used to store and/or read data from a memory array of the memory device. In some examples, the DLA is integrated into the periphery of the memory array in logic physically located beneath the memory array (e.g., in CMOS under the array).

As used herein, AI refers to the ability to improve a machine through "learning" such as by storing patterns and/or examples which can be utilized to take actions at a later time. Deep learning refers to a device's ability to learn from data provided as examples. Deep learning can be a subset of AI. Neural networks, among other types of networks, can be classified as deep learning. The low power, inexpensive design of deep learning accelerators can be implemented in internet-of-things (TOT) devices. The edge DLAs can process and make intelligent decisions at run-time. Memory devices including the edge DLAs can also be deployed in remote locations without cloud or offloading capability. As the areas in which applications are implemented diversify, the costs of maintaining and re-deploying faulty/failed/aged device comprising the DLAs in remote locations may significantly exceed the cost of the device itself. The age of devices such as a memory device can contribute to errors experienced by the device. As used herein, errors experienced by the device includes faults that the device experiences due to its age and/or use. The age of the memory device can be modeled and/or simulated. A Quality of Service may be lost over time due to aging. The Quality of Service loss may cause a device to no longer be usable for the purpose of deep learning applications.

Aspects of the present disclosure address the above and other deficiencies. For instance, a model employed by the DLAs can be trained to function in spite of age based errors experienced by the device hosting the DLAs. The models implemented by the DLAs can be trained by introducing errors into the models implemented by the DLA. Introducing errors into the model can provide the DLAs the ability to function in spite of errors experienced by the device. Introducing errors into a DLA model during training can allow for the DLA to function even when inputs provided to the DLA and from the memory array include uncorrected errors.

The figures herein follow a numbering convention in which the first digit or digits correspond to the drawing figure number and the remaining digits identify an element or component in the drawing. Similar elements or components between different figures may be identified by the use of similar digits. For example, 115-1 or 115-2 may reference element "15" in FIG. 1, and a similar element may be referenced as 215 in FIG. 2. Analogous elements within a Figure may be referenced with a hyphen and extra numeral or letter. See, for example, elements 115-1, 115-2 in FIG. 1. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system 100 including a memory device 103 in accordance with a number of embodiments of the present disclosure. As used herein, a memory device 103, memory array 110, and/or a host 102, for example, might also be separately considered an "apparatus.

In this example, the computing system 100 includes a host 102 coupled to memory device 103 via an interface 104. The computing system 100 can be a personal laptop computer, a desktop computer, a digital camera, a mobile telephone, a memory card reader, or an Internet-of-Things (IoT) enabled device, among various other types of systems. Host 102 can include a number of processing resources (e.g., one or more processors, microprocessors, or some other type of controlling circuitry) capable of accessing memory 103. The computing system 100 can include separate integrated circuits, or both the host 102 and the memory device 103 can be on the same integrated circuit. For example, the host 102 may be a system controller of a memory system comprising multiple memory devices 103, with the system controller providing access to the respective memory devices 103 by another processing resource such as a central processing unit (CPU).

In the example shown in FIG. 1, the host 102 is responsible for executing an operating system (OS) and/or various applications that can be loaded thereto (e.g., from memory device 103 via control circuitry 105). The OS and/or various applications can be loaded from the memory device 103 by providing access commands from the host 102 to the memory device 103 to access the data comprising the OS and/or the various applications. The host 102 can also access data utilized by the OS and/or various applications by providing access commands to the memory device 103 to retrieve said data utilized in the execution of the OS and/or the various applications.

For clarity, the computing system 100 has been simplified to focus on features with particular relevance to the present disclosure. The memory array 110 can be a DRAM array, SRAM array, STT RAM array, PCRAM array, TRAM array, RRAM array, NAND flash array, NOR flash array, and/or 3D Cross-point array for instance. The array 110 can comprise memory cells arranged in rows coupled by access lines (which may be referred to herein as word lines or select lines) and columns coupled by sense lines (which may be referred to herein as digit lines or data lines). Although the memory array 110 is shown as a single memory array, the memory array 110 can represent a plurality of memory arrays arraigned in banks of the memory device 103.

The memory device 103 includes address circuitry 106 to latch address signals provided over an interface 104. The interface can include, for example, a physical interface (e.g., a data bus, an address bus, and a command bus, or a combined data/address/command bus) employing a suitable protocol. Such protocol may be custom or proprietary, or the interface 104 may employ a standardized protocol, such as Peripheral Component Interconnect Express (PCIe), Gen-Z interconnect, cache coherent interconnect for accelerators (CCIX), or the like. Address signals are received and decoded by a row decoder 108 and a column decoder 112 to access the memory arrays 110. Data can be read from memory arrays 110 by sensing voltage and/or current changes on the sense lines using sensing circuitry 111. The sensing circuitry 111 can be coupled to the memory arrays 110. Each memory array and corresponding sensing circuitry can constitute a bank of the memory device 103. The sensing circuitry 111 can comprise, for example, sense amplifiers that can read and latch a page (e.g., row) of data from the memory array 110. The I/O circuitry 107 can be used for bi-directional data communication with the host 102 over the interface 104. The read/write circuitry 113 is used to write data to the memory arrays 110 or read data from the memory arrays 110. As an example, the circuitry 113 can comprise various drivers, latch circuitry, etc.

Control circuitry 105 decodes signals provided by the host 102. The signals can be commands provided by the host 102. These signals can include chip enable signals, write enable signals, and address latch signals that are used to control operations performed on the memory array 110, including data read operations, data write operations, and data erase operations. In various embodiments, the control circuitry 105 is responsible for executing instructions from the host 102. The control circuitry 105 can comprise a state machine, a sequencer, and/or some other type of control circuitry, which may be implemented in the form of hardware, firmware, or software, or any combination of the three. In some examples, the host 102 can be a controller external to the memory device 103. For example, the host 102 can be a memory controller which is coupled to a processing resource of a computing device. Data can be provided to the memory array 110 and/or from the memory array via the data lines coupling the memory array 110 to the I/O circuitry 107.

The memory device (e.g., memory sub-system) can also comprise a DLA 114. The DLA can be implemented on an edge of the memory device. For example, the DLA 114 can be implemented external to the memory array 110. The DLA 114 can be coupled to an output path that couples the memory array 110 to the I/O circuitry 107.

The DLA 114 can also be coupled to the control circuitry 105. The control circuitry 105 can control the DLA 114. For example, the control circuitry 105 can provide signaling to the row decoder 108 and the column decoder 112 to cause the transferring of data from the memory array 110 to the DLA 114 to provide an input to the DLA 114 and/or an ANN which is hosted by the DLA 114. The control circuitry 105 can also cause the output of the DLA 114 and/or the ANN to be provided to the I/O circuitry 107 and/or be stored back to the memory array 110.

Figure 2:
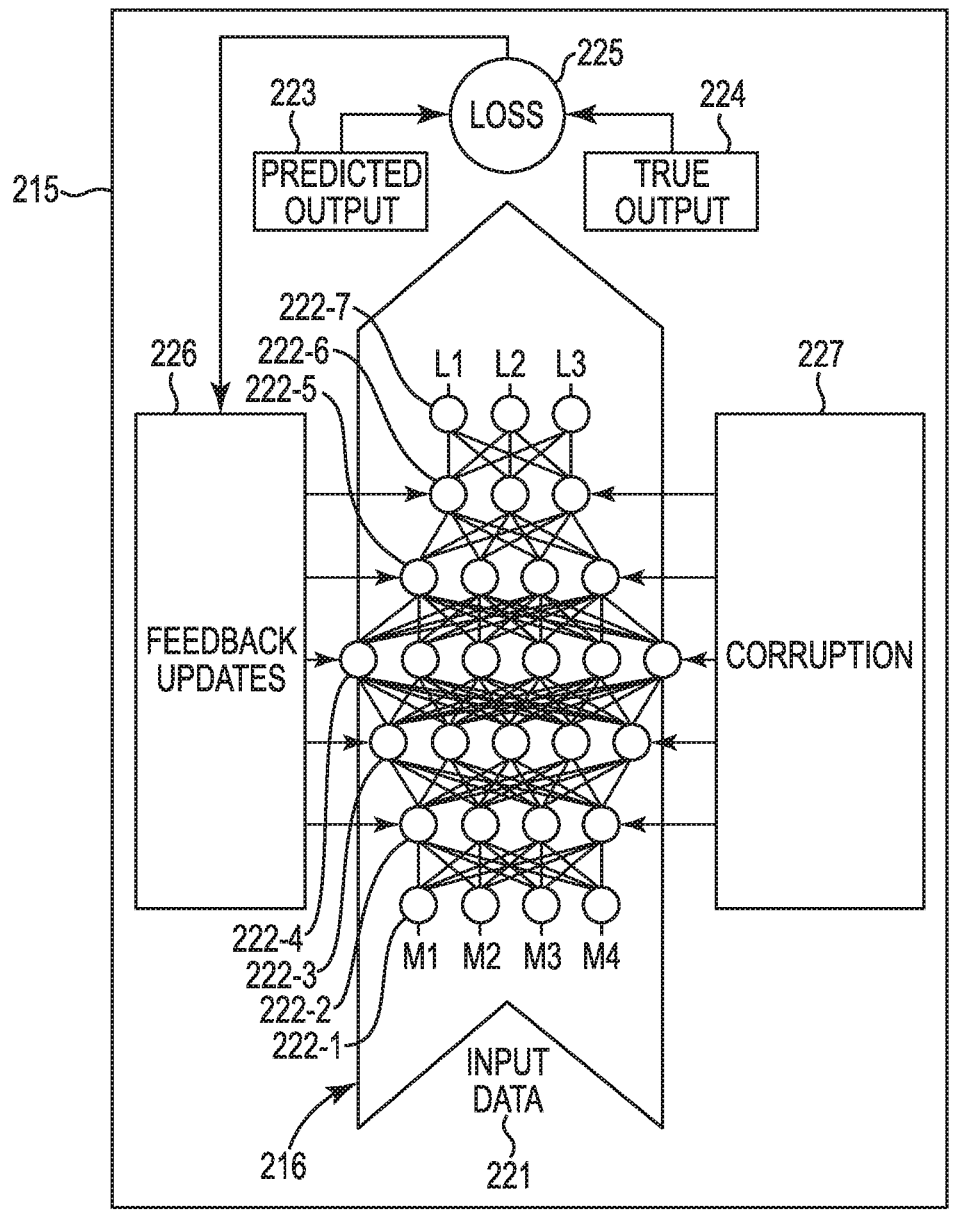
FIG. 2 illustrates artificial neural network training in memory in accordance with a number of embodiments of the present disclosure.

The DLA 114 can host an ANN such as an ANN 216 in FIG. 2. The DLA 114 can implement the ANN to perform learning. However, the memory array 110 can experience errors as the memory array 110 ages. As used herein, an error describes a function of the memory array 110 that is outside the parameters defined for the memory array 110.

Some of the contributing factors that lead to aging of memory blocks of the memory array 110 and/or the sensing circuitry 111 can include negative bias temperature instability (NBTI), hot carrier injection (HCI), and temperature dependent dielectric breakdown (TDDB), among others. The aging effects worsen as the memory array 110 is scaled to smaller sizes. The aging of the memory array 110 and/or processing variations of the memory array 110 can lead to a gradual increase in the threshold voltage of transistors and/or induced vulnerabilities. NBTI can also cause a decrease in mobility, drain current, and/or transconductance. These changes in transistor characteristics can manifest themselves as dead memory cells in DRAM that are often overcome through error correcting codes (ECC) and finally, through redundant memory blocks. The built-in ECC capabilities of the memory device 103 can be limited to a correction of a particular quantity of bits (e.g., 1-bit) per memory block of the memory array 110. Once, the number of erroneous bits crosses a threshold, the memory block can continue to be utilized. For example, the memory block can be read to provide inputs to the DLA 114 even after the ECC is incapable of correcting bits in the memory block of the memory array 110.

As such, errors can lead to a malfunction of the memory array 110 and/or the memory device 103. The examples described herein can include the training of the ANN hosted by the DLA 114 such that the ANN is robust to the errors experienced by the memory array 110 and/or the potential errors that may be experienced by the memory array 110.

The ANN can be trained to be robust to errors experienced by the memory array 110 by introducing errors to a model, where the model is an ANN model. As used herein, an ANN model can describe an object that is trained. An ANN can describe the implementation of the ANN model in hardware. For example, an ANN model may be trained and implemented as an ANN in the DLA 114. The errors introduced into the ANN model can simulate aging of the memory array 110 and/or the memory device 103, can be based on the age of the memory array 110 and/or the memory device 103, and/or a type of the memory device 103, among other characteristics of the memory array 110 and/or the memory device 103 that can be used to introduce errors into the ANN model.

For better generalization, regularization is a technique often used in this domain. One regularization technique is known as dropout. Dropout is achieved by completely disabling some weights and biases of a neural network at training time. In this manner, the neural network is able to learn more generalized information by not relying on individual information paths through the network. While dropout introduces failures, it does not represent and/or model the behavior of a failed memory cell. While dropout completely disables the input from a previous layer, a number of embodiments introduce "systematic" noise in the weights and/or biases at each layer. The noise introduced into the weights and/or biases can be referred to as errors and/or changes. The errors and/or change are referred to as "systematic" given that the errors are introduced to the weights and/or biases to model architecture of a memory and/or computing device instead of randomly.

The ANN model can be trained by the DLA 114, the training circuitry 115-1 of the control circuitry 105 and/or the training circuitry 115-2 of the host 102. For example, the host 102 and/or the control circuitry 105 can train an ANN model which can be provided to the DLA 114. The DLA 114 can implement the trained ANN model as directed by the control circuitry 105. The training of the ANN model using errors can provide for an ANN that can generate accurate results even though the inputs may experience errors given that the memory array 110 experiences errors.

Figure 4:
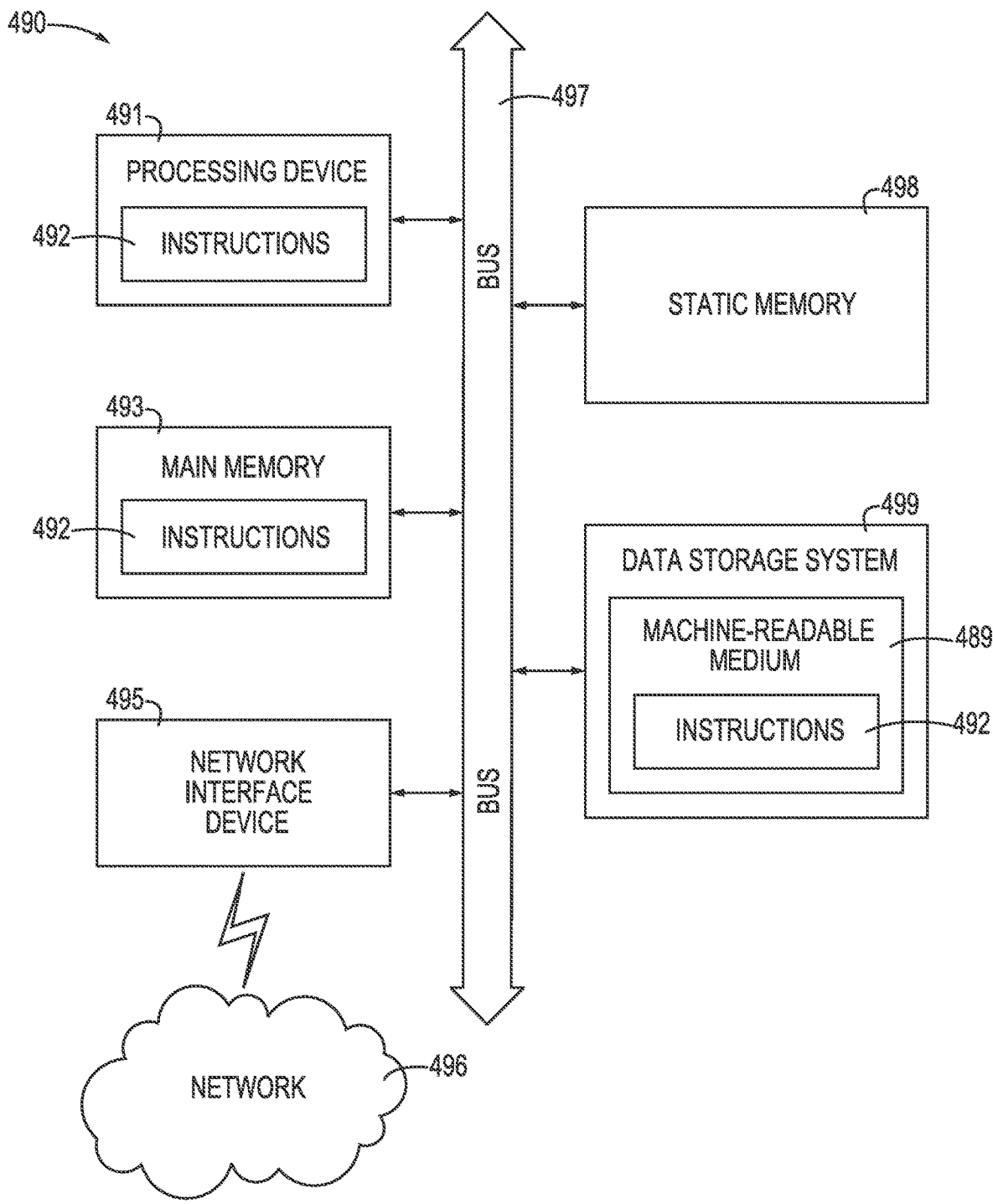
FIG. 4 illustrates an example machine of a computer system within which a set of instructions, for causing the machine to perform various methodologies discussed herein, can be executed.

In various examples, the host 102 can be coupled to the memory device 103 via a network such as network 496 in FIG. 4. For instance, the host 102 and/or the memory device 103 can be part of a cloud computing system. The bit error rate (BER) or other error information can be provided to the host 102 over a network connection and from a memory array 110. The host 102 can utilize the BER or the other error information to train the ANN model. The host 102 can then provide the ANN model over a network to the memory array 110 for execution.

FIG. 2 illustrates artificial neural network training in memory in accordance with a number of embodiments of the present disclosure. The ANN model 216 can be trained by the training circuitry 215.

The ANN model 216 can receive input data 221 and can generate a predicted output 223. The ANN model 216 can comprise layers of nodes including the layers 222-1, 222-2, 222-3, 222-4, 222-5, 222-6, 222-7. The layer 222-1 can provide the input data 222-1 and can be referred to as an input layer 222-1. The layer 222-7 can provide output data referred to as the predicted output 223. The layer 222-7 can also be referred to as an output layer. The layers 222-1, 222-2, 222-3, 222-4, 222-5, 222-6, 222-7 can be referred to as layers 222.

The layer 222-1 can comprise the nodes 228-1, 228-2, 228-3, 228-4. The layer 222-2 can comprise the nodes 228-5, 228-6, 228-7, 228-8. The layer 222-3 can comprise the nodes 228-9, 228-10, 228-11, 228-12, 228-13. The layer 222-4 can comprise the nodes 228-14, 228-15, 228-16, 228-17, 228-18, 228-19. The layer 222-5 can comprise the nodes 228-20, 228-21, 228-22, 228-23. The layer 222-6 can comprise the nodes 228-24, 228-25, 228-26. The layer 222-7 can comprise the nodes 228-27, 228-28, 228-29. The nodes 228-1 to 228-29 can be referred to as nodes 228. Although FIG. 2 shows the layers 222 and the nodes 228, the ANN model 216 can include more or less layers 222 and/or nodes 228 than those shown herein.

Each of the nodes 228 of the layers 222 can be coupled to adjacent nodes. For example, each of the nodes 228-1 to 228-4 of the layer 222-1 can be coupled to each of the nodes 228-5 to 228-8 of the layer 222-2. Each of the nodes 228-5 to 228-8 of the layer 222-2 can be coupled to each of the nodes 228-9 to 228-13 of the layer 222-3. Each of the nodes 228-9 to 228-13 of the layer 222-3 can be coupled to each of the nodes 228-14 to 228-19 of the layer 222-4. Each of the nodes 228-14 to 228-19 of the layer 222-4 can be coupled to each of the nodes 228-20 to 228-23 of the layer 222-5. Each of the nodes 228-20 to 228-23 of the layer 222-5 can be coupled to each of the nodes 228-24 to 228-26 of the layer 222-6. Each of the nodes 228-24 to 228-26 of the layer 222-6 can be coupled to each of the nodes 228-27 to 228-26 of the layer 222-7.

Signals can be provided from the nodes of the input layer 222-1 through the nodes of the layers 222-2, 222-3, 222-4, 222-5, 222-6 and to the nodes of the output layer 222-7. For example, each of the nodes 228-1, 228-2, 228-3, 228-4 of layer 222-1 can provide a signal to each of the 228-5, 228-6, 228-7, 228-7 of layer 222-2. Each of the connections between the nodes 228 can be assigned a weight. For example, the connection between the node 228-1 and the node 228-5 can be assigned a first weight, the connection between the node 228-1 and the node 228-6 can be assigned a second weight, the connection between the node 228-1 and the node 228-7 can be assigned a third weight, and the connection between the node 228-1 and the node 228-8 can be assigned a fourth weight.

The node 228-1 can provide an input signal to each of the nodes 228-5, 228-6, 228-7, 228-8. The weights can be combined with the corresponding input signal. For example, the first weight can be multiplied with the input signal provided from the node 228-1 to the node 228-5. The second weight can be multiplied with the input signal provided from the node 228-1 to the node 228-6. The third weight can be multiplied with the input signal provided from the node 228-1 to the node 228-7. The fourth weight can be multiplied with the input signal provided from the node 228-1 to the node 228-8. Each of the nodes 228-5, 228-6, 228-7, 228-8 can perform the multiplication. Each of the nodes 228 can sum the product of the input signals and the corresponding weights. A bias can be added to the sum. The addition (e.g., sum of the bias and the sum of the product of the input signals and the corresponding weights) can be performed by the nodes 228. The result of the addition can be used in an activation function to determine whether the corresponding node will provide a signal to each of the nodes to which the corresponding node is coupled to. For example, the result of the addition can be used in an activation function to determine whether the node 228-5 provides a signal to the nodes 228-9, 228-10, 228-11, 228-12, 228-13. Each of the nodes 228 can perform an activation function.

As used herein, a topology of the ANN model 216 can describe the coupling of the nodes 228. The topology of the ANN model 216 can also describe the quantity of nodes 228. The topology of the ANN model 216 can further describe the layers 222 of the ANN model 216 and/or the quantity of the layers 222.

The nodes 228-27, 228-28, 228-29 of the layer 222-7 can provide signals that represent a predicted output 223. The predicted output can be compared to the true output 224. As used herein the predicted output can be an output generated using the ANN model 216 while the true output 224 can represent the right output (e.g., right answer) that is expected based on the input data 221 provided to the ANN model 216.

The circuitry 225 can compare the predicted output 223 to the true output 224. The weights and the biases can be updated by circuitry 226 responsive to the comparison of the predicted output 223 and the true output 224.

In a number of examples, a corruption circuitry 227 (e.g., emulate aging-like bit corruption) can introduce errors into the ANN model 216. The errors introduced into the ANN model 216 can mimic age-based errors experienced by the memory device 103 or can be based on age-based errors experienced by the memory device 103 in FIG. 1.

For example, the errors introduced into the ANN model 216 can be based on the type of a memory device that implements an ANN. For example, a first quantity of errors can be introduced into the ANN model 216 responsive to the memory device being of a first type and a second quantity of errors can be introduced into the ANN model 216 responsive to the memory device being of a second type. The first quantity of errors can be different from the second quantity of errors. For example, the types of memory devices can include DRAM, SRAM, NAND flash memory, NOR flash memory, ROM, EEPROM, EPROM, resistance variable memory such as PCRAM, RRAM, and MRAM, among others. Each of the different types of memory devices can experience different types of errors and/or can experience different quantity of errors at a given age of the memory device.

Some examples of non-volatile memory devices (e.g., memory device 130) include NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

In various instances, the errors introduced into the ANN model 216 can be based on a quantity of errors expected to be experienced by the memory device, among other characteristics of the memory device upon which the quantity of errors introduced into the ANN model 216 can be based. A determination of the quantity of errors expected to be experienced by the memory device can be based on the age of a memory device or a system level memory model and/or simulation that experiences aging related failures under a specific workload. The determination can be made prior to implementing the ANN model 216 in the DLA of a memory device or prior to deployment of the memory device. The errors introduced into the ANN model 216 can take the form of modifications to the weights, biases, nodes 228, and/or layers 222, among other characteristics of the ANN model 216. For example, the errors can be introduced into the ANN model 216 by modifying the weights and/or biases of the ANN model 216. Introducing errors into the weights and/or biases of an ANN model 216 can include setting one or more of the weight values and/or the bias values to a plurality of predetermined bit values (e.g., one or more 1-bits and/or one or more 0-bits).

In various instances, the quantity of errors or the type of errors introduced into the ANN model 216 can be based on an expected bit-error rate of the memory device. As used herein, a bit-error rate can define a percentage of bits that have errors relative to the total number of bits in a transmission. For example, the bit-error rate can include the percentage of bits that have errors in the input data 221 and/or the percentage of bits that have errors in a page of data read from a memory array, among other examples of a bit-error rate. Introducing errors into an ANN model 216 based on the expected bit-error rate of the memory device can allow for a training of the ANN model 216 to accommodate for the expected bit-error rate of the memory device. As the memory device ages and experiences bit-errors, the ANN can continue to function as expected given that the ANN model 216 was trained to account of the bit-errors.

In a number of examples, the quantity of errors introduced into the ANN model 216 can be a fixed amount of errors regardless of the characteristics of the memory device, including the bit-error rate. Introducing errors into the ANN model 216 can include adding nodes and/or layers to the ANN model 216. For example, an error can be introduced into the ANN model 216 by adding a node to the layer 222-4 which was not previously defined. Introducing errors into the ANN model 216 can also include deleting nodes and/or layers from the ANN model 216 such as node 228-14.

In various instances, the age of the memory device can be used to determine whether to introduce errors and/or how many errors to introduce. The age of the memory device can be a model and/or simulation age of the memory device as oppose to an actual age of the memory device. As used herein, reference to an age of a memory device can include a modeled and/or simulated age of the memory device. The age of the memory device can be used to determine where to introduce the errors into the ANN model 216. For example, if the age (e.g., simulated and/or modeled age) of a memory device is greater than a first threshold but less than a second threshold, then a first quantity of errors can be introduced into the memory device. If the age (e.g., simulated and/or modeled age) of the memory device is greater than the second threshold but less than a third threshold, then a second quantity of errors can be introduced into the memory device.

The amount of aging related errors introduced into the ANN model 216 can be controlled through a value in a given range such that the errors introduced into the ANN model 216 are directly proportional to the value up to the point (e.g., threshold) where the memory device fails as the ANN no longer is able to accommodate for the aging. Once the memory device fails due to the errors experienced by a block of the memory device, the bloc of the memory device can be disabled and/or retired given that the memory block is unusable for providing data to the ANN model 216 and/or utilized otherwise.

The errors experienced by the memory device can be corrected using ECC and/or redundant circuitry. The errors introduced into the ANN model 216 can be based on whether the ECC and/or the redundant circuitry is used in the memory device. The errors introduced into the ANN model 216 can also be based on a quantity of errors the ECC and/or the redundant circuitry correct. For example, if an ECC is unable to correct a portion of the errors that are present in the use of the memory cells of the memory device, then the data retrieved from the memory cells and utilized to run an ANN can cause the ANN to malfunction (e.g., provide outputs that are unexpected). As such, errors can be introduced into a corresponding ANN model 216 during training to compensate for the errors that are uncorrectable by the ECC.

It can be determined whether an ECC is utilized to correct errors in the memory array. It can be determined whether the ECC is utilized in execution of the ANN 215. Responsive to determining that the ECC is utilized to correct errors in the memory array and responsive to determining that the ECC is utilized in execution of an artificial neural network, the ANN model implemented at an edge of the memory array can be modified based on characteristics of the ECC and/or the redundant circuitry. The ANN model (e.g., ANN model trained with errors) can be implemented at the edge of the memory array.

The characteristics of the ECC and/or redundant circuitry can comprise uncorrectable errors identified by the ECC. The characteristics of the ECC can also include a total number of errors identified by the ECC and/or corrected by the redundant circuitry. The characteristics of the ECC and/or redundant circuitry can include a worst case scenario of the total errors that can be corrected by the ECC and/or the redundant circuitry or a worst case scenario of the uncorrectable errors that can be experienced by the ECC.

Figure 3:
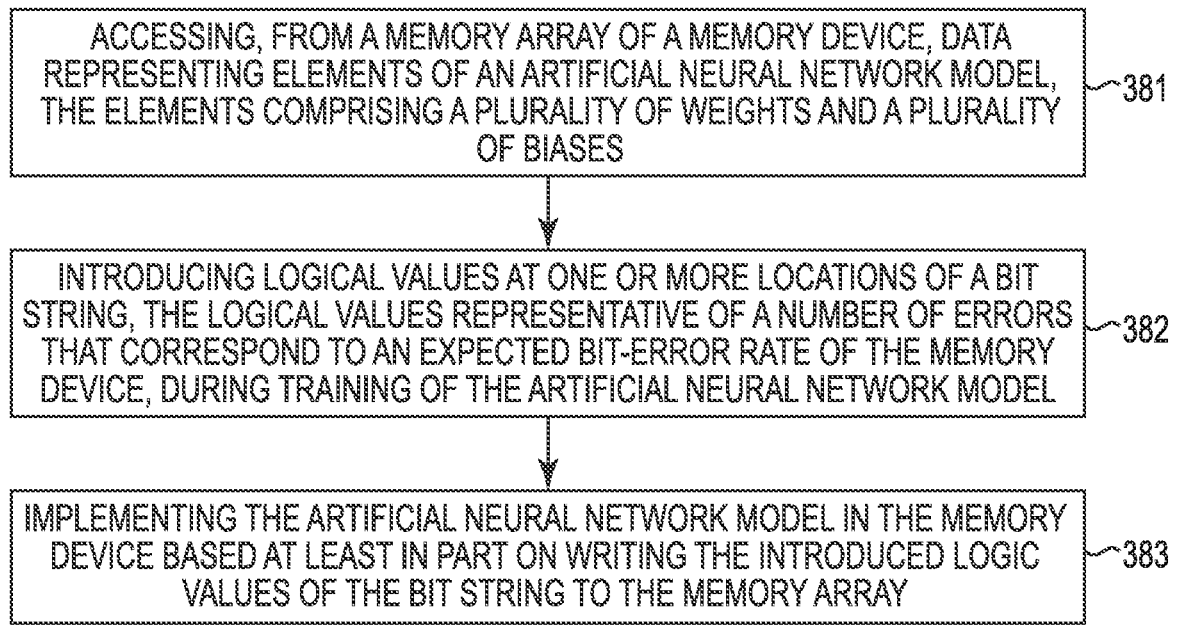
FIG. 3 illustrates an example flow diagram of a method for artificial neural network training in memory in accordance with a number of embodiments of the present disclosure.

FIG. 3 illustrates an example flow diagram of a method for artificial neural network training in memory in accordance with a number of embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by the control circuitry (e.g., controller) 105 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 381, data representing elements of an artificial neural network model can be accessed from a memory array of a memory device. The elements can comprise a plurality of weights and a plurality of biases. That is, the weights and biases of an ANN model can be stored in a memory device. Bit-errors can be experienced in retrieving the weights and biases from the memory device. As such, implementing the ANN using weights and biases that comprise bit-errors can result in an ANN that provides unexpected results.

At block 382, logic values at one or more locations of a bit string can be introduced during training of the artificial neural network model. The logical values can represent a number of errors that correspond to an expected bit-error rate of the memory device. Training the ANN model to include errors can overcome the bit-errors introduced by reading data, weights, values, and/or nodes from the memory device. As used herein, the elements of the ANN can be represented as bit strings comprise of logic values. As such, the ANN can be modified by modifying the logic values of a corresponding bit string.

At block 383, the artificial neural network model can be implementing in the memory device based at least in part on writing the introduced logic values of the bit string to the memory array. The implementation of the ANN model can be referred to as an ANN.

The method can further comprise identifying a type of the memory device that implements the ANN. The number of errors can be introduced into the ANN model during training to responsive to identifying a type of the memory device.

Introducing the number of errors into the ANN model can further comprises modifying at least one of a weight and a bias of the ANN model. For example, introducing the number of errors can further comprise setting weights of the ANN to a plurality of 1-bits or 0-bits responsive to determining that the memory device is a particular type of memory device. Introducing the number of errors can further comprises setting the biases of the ANN to a plurality of 1-bits or 0-bits responsive to determining that the memory device is a particular type of memory device. Introducing the number of errors can also comprise modifying a quantity of nodes of the artificial neural network model. Introducing the number of errors further comprises introducing a fixed quantity of the number of errors regardless of the expected bit-error rate of the memory device or a type of the memory device.

In a number of examples, data representing elements of an ANN model can be accessed. The elements comprising a plurality of nodes stored in the memory array can be accessed. The plurality of nodes of the ANN model can be modified to introduce logical values at one or more locations of a bit string, the logical values representing a number of errors into the ANN model. A quantity of the number of errors can correspond to an expected bit-error rate of the memory array. The ANN model including the number of errors can be trained. The trained ANN model can be implemented in circuitry at the edge of the memory array based at least in part on writing the introduced logic values of the bit string to the memory array.

A number of nodes can be added to the plurality of nodes of the ANN model. A number of nodes can also be deleted from the plurality of nodes of the ANN model.

In various examples, the age of the memory array can be determined. The age of the memory array can be an indicator of the quantity of bit-errors that can be expected when reading data from the memory array. A number of errors can be introduced into the artificial neural network responsive to determining that the age of the memory array is greater than a threshold. The number of errors can correspond to expected errors experienced by the memory array due to the age of the memory array.

In various instances, a determination can be made as to whether an ECC is utilized in execution of an ANN. For examples, the ECC can be utilized in retrieving data from the memory array that can be utilized to execute the ANN. For instance, the weights, biases, nodes, topology of nodes, and/or different characteristics of the ANN can be stored and retrieved from the memory array. Retrieving (e.g., reading) data from the memory array can experience bit-errors which be corrected by the ECC prior to providing the data to the DLA. Retrieving data from the memory array can also experience bit-errors which may not corrected by the ECC. Providing data to the DLA which includes bit-errors can alter the result outputted from the DLA unless an ANN implemented by the DLA has been trained to accommodate for the bit-errors experienced in reading data from the memory array.

Responsive to determining that the ECC is utilized in execution of an artificial neural network, the ANN model implemented at an edge of a memory array can be modified based on characteristics of the ECC. The artificial neural network model can be implemented at the edge of the memory array. The characteristics of the ECC can comprise errors identified by the ECC that the ECC is unable to correct, a total number of errors that are identified by the ECC, a worst case scenario of the total number of errors that are identifiable by the ECC, and/or a worst case scenario of uncorrectable errors that are identifiable by the ECC, among other characteristics of the ECC.

In various instances, the artificial neural network model is implemented at the edge of the memory array while the memory array experiences more than one error and wherein the ECC corrects one of the more than one error. That is, the memory array can continue to be utilized even though the ECC is unable to correct a portion of the bit-errors experienced from reading data from the memory array. The memory array can continue to be utilized to implement an ANN.

FIG. 4 illustrates an example machine of a computer system 490 within which a set of instructions, for causing the machine to perform various methodologies discussed herein, can be executed. In various embodiments, the computer system 490 can correspond to a system (e.g., the computing system 100 of FIG. 1) that includes, is coupled to, or utilizes a memory sub-system (e.g., the memory device 103 of FIG. 1) or can be used to perform the operations of a controller (e.g., the controller circuitry 105 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 490 includes a processing device 491, a main memory 493 (e.g., read-only memory (ROM), flash memory, dynamic random access memory (DRAM) such as synchronous DRAM (SDRAM) or Rambus DRAM (RDRAM), etc.), a static memory 497 (e.g., flash memory, static random access memory (SRAM), etc.), and a data storage system 499, which communicate with each other via a bus 497.

Processing device 491 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 491 can also be one or more special-purpose processing devices such as an application specific integrated circuit (ASIC), a field programmable gate array (FPGA), a digital signal processor (DSP), network processor, or the like. The processing device 491 is configured to execute instructions 492 for performing the operations and steps discussed herein. The computer system 490 can further include a network interface device 495 to communicate over the network 496.

The data storage system 499 can include a machine-readable storage medium 489 (also known as a computer-readable medium) on which is stored one or more sets of instructions 492 or software embodying any one or more of the methodologies or functions described herein. The instructions 492 can also reside, completely or at least partially, within the main memory 493 and/or within the processing device 491 during execution thereof by the computer system 490, the main memory 493 and the processing device 491 also constituting machine-readable storage media.

In one embodiment, the instructions 492 include instructions to implement functionality corresponding to the host 102 and/or the memory device 103 of FIG. 1. While the machine-readable storage medium 489 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    accessing, from a memory array of a memory device, data representing elements of an artificial neural network model, the elements comprising a plurality of weights and a plurality of biases;
    introducing logical values at one or more locations of a bit string, the logical values representative of a number of errors that correspond to an expected bit-error rate of the memory device, during training of the artificial neural network model; and
    implementing the artificial neural network model in the memory device based at least in part on writing the introduced logic values of the bit string to the memory array.

2. The method of claim 1, further comprising identifying a type of the memory device that implements the artificial neural network model.

3. The method of claim 2, further comprising, introducing the logical values responsive to identifying the type of the memory device.

4. The method of claim 3, wherein introducing the logical values further comprises modifying at least one of a weight and a bias of the artificial neural network model.

5. The method of claim 3, wherein introducing the logical values further comprises setting the weights of the artificial neural network to a plurality of 1-bits or 0-bits responsive to determining that the memory device is a particular type of memory device.

6. The method of claim 3, wherein introducing the logical values further comprises setting the biases of the artificial neural network to a plurality of 1-bits or 0-bits responsive to determining that the memory device is a particular type of memory device.

7. The method of claim 3, wherein introducing the logical values further comprises modifying a quantity of nodes of the artificial neural network model.

8. The method of claim 1, wherein introducing the logical values further comprises introducing a fixed quantity of the number of errors regardless of the expected bit-error rate of the memory device or a type of the memory device.

9. An apparatus, comprising:
    a memory array;
    a controller coupled to the memory array and configured to:
        access data representing elements of an artificial neural network model, the elements comprising a plurality of nodes stored in the memory array;
        modify the plurality of nodes of the artificial neural network model to introduce logical values at one or more locations of a bit string, the logical values representing a number of errors, into the artificial neural network model, wherein a quantity of the number of errors corresponds to an expected bit-error rate of the memory array;
        train the artificial neural network model including the number of errors; and
        implement the trained artificial neural network model in circuitry at an edge of the memory array based at least in part on writing the introduced logic values of the bit string to the memory array.

10. The apparatus of claim 9, wherein the controller is further configured to add a number of nodes to the plurality of nodes of the artificial neural network model.

11. The apparatus of claim 10, wherein the controller is further configured to delete a number of the plurality of nodes of the artificial neural network model.

12. The apparatus of the 9, wherein the controller is further configured to determine a simulated age of the memory array.

13. The apparatus of claim 12, wherein the controller is further configured to introduce the number of errors into the artificial neural network responsive to determining that the simulated age of the memory array is greater than a threshold.

14. The apparatus of claim 12, wherein the number of errors corresponds to expected errors experienced by the memory array due to the simulated age of the memory array.

15. A non-transitory computer-readable medium having computer-readable instructions, which when executed by a computer, cause the computer to:
    determine whether an error correction code (ECC) is utilized in execution of an artificial neural network;
    responsive to determining that the ECC is utilized in execution of the artificial neural network, modify an artificial neural network model implemented at an edge of a memory array based on characteristics of the ECC; and
    implement the artificial neural network model at the edge of the memory array.

16. The non-transitory computer-readable medium of claim 15, wherein the characteristic of the ECC comprises errors identified by the ECC that the ECC is unable to correct.

17. The non-transitory computer-readable medium of claim 16, wherein the characteristic of the ECC further comprises a total number of errors that are identified by the ECC.

18. The non-transitory computer-readable medium of claim 17, wherein the characteristics of the ECC comprise a worst-case scenario of the total number of errors that are identifiable by the ECC.

19. The non-transitory computer-readable medium of claim 17, wherein the characteristics of the ECC comprises a worst-case scenario of uncorrectable errors that are identifiable by the ECC.

20. The non-transitory computer-readable medium of claim 15, wherein the artificial neural network model is implemented at the edge of the memory array while the memory array experiences more than one error and wherein the ECC corrects one of the more than one error.

* * * * *